United States Patent
Wenzel

(10) Patent No.: US 9,015,518 B1
(45) Date of Patent: Apr. 21, 2015

(54) METHOD FOR HIERARCHICAL CLUSTER VOTING IN A CLUSTER SPREADING MORE THAN ONE SITE

(75) Inventor: Thomas R. Wenzel, Almere (NL)

(73) Assignee: NetApp, Inc., Sunnyvale, CA (US)

( * ) Notice: Subject to any disclaimer, the term of this patent is extended or adjusted under 35 U.S.C. 154(b) by 481 days.

(21) Appl. No.: 13/546,513

(22) Filed: Jul. 11, 2012

(51) Int. Cl.
    G06F 11/00    (2006.01)
    G06F 11/14    (2006.01)

(52) U.S. Cl.
    CPC .................. G06F 11/1479 (2013.01)

(58) Field of Classification Search
    CPC ................. G06F 11/0709; G06F 11/1425
    USPC ........................................... 714/4.1
    See application file for complete search history.

(56) References Cited

U.S. PATENT DOCUMENTS

| | | | |
|---|---|---|---|
| 6,782,416 B2 | 8/2004 | Cochran et al. | |
| 7,016,946 B2 | 3/2006 | Shirriff | |
| 7,496,782 B1 * | 2/2009 | Kownacki | 714/4.4 |
| 7,644,305 B2 | 1/2010 | Friedrich et al. | |
| 2010/0185894 A1 * | 7/2010 | Herta | 714/4 |

* cited by examiner

*Primary Examiner* — Michael Maskulinski
(74) *Attorney, Agent, or Firm* — LeClairRyan, a Professional Corporation

(57) ABSTRACT

Resources may be assigned to nodes within a cluster of nodes and the nodes grouped to form sites. Each of the sites may elect a primary node to handle communications between the site and other sites within the cluster. The primary node of a site may be selected by a node identification number assigned to the node. When a node disconnects from a site, the node may form a temporary site and attempt to reestablish communications with the cluster. If communications are restored with the original site, then the node may rejoin the site. If communications with other sites are restored, then the node may form a new site. The dynamic cluster is tolerant to faults and failures within the nodes, because the nodes have information regarding the entire cluster. A site may remain operational with as few as one remaining node.

20 Claims, 13 Drawing Sheets

METHOD FOR HIERARCHICAL CLUSTER VOTING IN A CLUSTER SPREADING MORE THAN ONE SITE

TECHNICAL FIELD

This application is related to storage devices. In particular, this application is related more specifically to cluster voting for network attached storage devices.

BACKGROUND OF THE INVENTION

Redundant storage systems may include multiple storage devices connected by communications links in a network. The storage systems may be accessed by nodes in a cluster, which serve data in the storage devices to client devices. Nodes within the cluster may be organized into sites. Nodes with a site use a voting mechanism to select certain nodes as responsible for maintaining the site. For example, an elected node, or primary node, may monitor and distribute resources within the cluster. Each site may select one node as a primary node.

Conventional voting systems generally select primary nodes based on a majority vote of the nodes in the site. The nodes may be weighted, such that the nodes have a different number of votes.

There are a number of failure scenarios that may be handled by the conventional majority voting scheme. For example, a cluster may include five nodes, in which a first physical site has three nodes and a second physical site has two nodes. Because the first site has three nodes, the first site is the primary site of the cluster. If the two nodes of the second physical site lose communications with the first physical site, then only a minority of the nodes of the cluster fail. Thus, decisions that require a majority of the nodes may still be made within the cluster. The three remaining nodes of an unweighted voting scheme may still constitute a majority within the cluster. Thus, the three remaining nodes may coordinate to redistribute resources previously served by the two disconnected nodes. The three nodes may remain functional even when two nodes fail.

If, however, the first physical site fails, which is the primary site, then the second physical site will also fail. Because the second physical site is not the primary site, the second physical site cannot recover from the loss of communications with the first physical site. Thus, a failure of three nodes of the cluster of five nodes causes the entire cluster to fail. The two remaining nodes comprising a minority in the cluster could otherwise continue to function in serving resources to clients but for the majority voting scheme.

In some conventional solutions, cluster voting systems described above may incorporate a common quorum device to communication, update, and exchange votes. In such an arrangement, each node is responsible for communicating with the quorum device to cast votes and read status updates regarding the state of the cluster. Such a single quorum device is also a failure point for large clusters.

It is undesirable for even a large failure affecting the majority of the nodes to result in a failure of the cluster. For example, in a cluster having a first physical site with 51 nodes and a second physical site of 49 nodes, a failure of the 51 nodes of the first physical site would cause a shutdown of the remaining 49 nodes, which would otherwise continue to function. The remaining nodes are unable to function in the site because they do not have information regarding communications paths in the cluster. Instead, only the primary node elected by the majority has information regarding resources within the cluster. Thus, a more flexible management system is necessary to properly utilize resources in redundant storage systems.

BRIEF SUMMARY OF THE INVENTION

Each node in a cluster may store information regarding the view of the cluster, such that the cluster has improved resilience in situations where some nodes of the cluster fail. Nodes in a cluster may be organized into logical sites, which may or may not share the same physical location. A primary node is elected from each site to manage communications between the site and other sites. Thus, a primary node may communicate with primary nodes at other sites and member nodes within the primary node's site. Because each node has information regarding other nodes, both primary nodes and member nodes, within the cluster when a node loses communication with a primary node and all member nodes of the site, the node may establish a temporary site and attempt communications with the primary nodes of other sites. Member nodes that remain in communication with the disconnected node may become part of the temporary site. Within the temporary site a primary node may be elected, and the primary node attempts to establish communication with other sites. When communication is reestablished with other sites, the primary node may establish a temporary site or rejoin the site from which the node that lost communication. If a node loses communication with the primary node of the site but not all member nodes of the site, one of the member nodes may serve as a proxy for the node to allow the node to remain in the site. According to one embodiment, a node acting as a proxy may have direct communications to the primary node of the site. That is, a proxy may not be able to act as a proxy for another node. Additionally, because each node has information regarding the state of the cluster, a site does not fail when a majority of nodes within the site fail. A site may remain active with as few as one remaining node.

In a cluster organized according to logical sites with the communications described above, a node may remain active as long as the node has communication to the primary node of its site, another node of its site, or has established or is a member of a temporary site of which the primary node of the temporary site has communications to at least one other primary node of another site. Thus, nodes within the cluster are significantly more resilient in remaining active than nodes of the prior art systems.

In one failure scenario, a primary node loses connection with all member nodes in a site. When the primary node loses connection to the member nodes, the remaining member nodes of the site may elect a new primary node. Because each node has information regarding the state of the cluster, any node may be selected as the new primary node. Predetermined criteria, such as node identification number may be used to select a new primary node for the site. The disconnected primary node may form a temporary site by reestablishing communications with other primary nodes in the cluster. If the new primary node is successful, the temporary site may become a new temporary site in the cluster. The disconnected primary node may also attempt to reconnect with the primary node and member nodes of the original site. When the primary node is successful in reestablishing communications with the original site, the node will re-join the original site as a member node. Subsequently, a new election process may be performed in the site to select a new primary node.

In another failure scenario, a node loses connection with member nodes in a site. When the node loses connection, the node may attempt to establish a temporary site. Because the node has information regarding the state of the cluster, the disconnected node may attempt to reestablish communications with other primary nodes throughout the cluster. If the node is successful in establishing communications with at least one primary node in another site, the temporary site is added to the cluster.

In a further failure scenario, a site loses connection with other sites in the cluster when the primary node of the site loses communication with primary nodes at other sites. Each node of the site may attempt to reestablish communications with another primary node in the cluster. If any of the nodes is successful in contacting another primary node, that node may be elected as the new primary node for the site. The election of a new primary node, which has communication paths available to other primary nodes, may allow the site to remain operational. If communications with other sites cannot be established, the nodes may enter a standby mode.

In each of the failure scenarios described above, a disconnected node may reestablish communications with other nodes in the cluster by using information regarding the state of the cluster. The information regarding the state of the cluster may be communicated at intermittent or periodic intervals from primary nodes to other primary nodes and from a primary node to member nodes of the primary node's site and between member nodes that act as a proxy for other member nodes. The availability of information allows each node to function independently when disconnected from other nodes, including the primary node of the node's site. The capability of independent communications by each of the nodes enhances the reliability of the network. That is, when the node is capable of reestablishing communications independently, the node is less likely to become unavailable to clients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
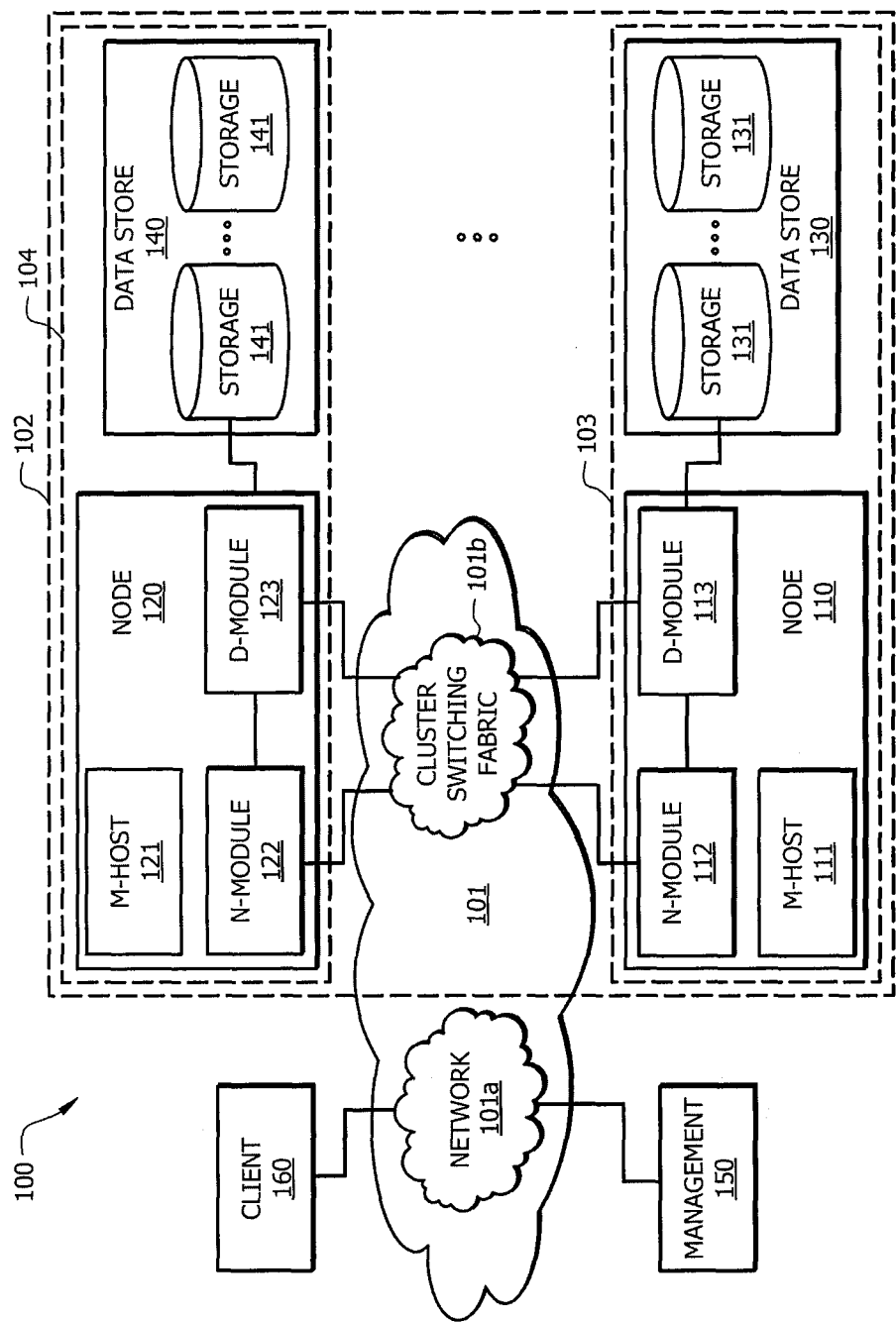
FIG. 1 shows a block diagram of a system adapted according to embodiments of the invention to provide intelligent automated support.

FIG. 1 shows a block diagram of a system adapted according to embodiments of the invention to provide a resilient network for serving resources to clients. System 100 of FIG. 1 comprises an exemplary clustered network environment in which storage system 102 includes data storage sub-systems 103 and 104 coupled via network 101. Nodes 110 and 120 of the system 100 may be part of a larger storage system. Each of nodes 110 and 120 may be organized into the same or a different site, as described in further detail in FIG. 2 below. Each site is a collection of nodes, such as nodes 110 and 120, that cooperate to provide storage services to client 160.

Data storage sub-systems 103 and 104 of embodiments may comprise one or more modules, components, etc. operable to provide operation as described herein. For example, data storage sub-systems 103 and 104 of the illustrated embodiment comprise nodes 110 and 120 and data store devices 130 and 140, respectively. It should be appreciated that nodes and/or data store devices of data storage sub-systems 103 and 104 may themselves comprise one or more modules, components, etc. Nodes 110 and 120 of the illustrated embodiment comprise management elements (also referred to herein as "M-Hosts") 111 and 121, network modules (also referred to herein as "N-Modules") 112 and 122, and data modules (also referred to herein as "D-Modules") 113 and 123, respectively. Data store devices 130 and 140 of the illustrated embodiment comprise one or more storage media 131 and 141 (e.g., hard disk drives, solid state drives, optical disks, flash memory, etc.) operable to store user and/or other data, respectively.

The modules, components, etc. of data storage sub-systems 103 and 104 may comprise various configurations suitable for providing operation as described herein. For example, nodes 110 and 120 may comprise processor-based systems, such as file server systems, computer appliances, computer workstations, etc. Accordingly, nodes 110 and 120 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 130 and 140 may, for example, comprise disk memory, flash memory, optical memory, and/or other suitable computer readable media and associated circuitry (e.g., interfaces, controllers, decoders, etc.). Data modules 113 and 123 of nodes 110 and 120 may be adapted to communicate with data store devices 130 and 140 according to a storage area network (SAN) protocol (e.g., small computer system interface (SCSI), fiber channel protocol (FCP), INFINIBAND, etc.) and thus data store devices 130 and 140 may appear as a locally attached resources to the operating system. That is, as seen from an operating system on nodes 110 and 120, data store devices 130 and 140 may appear as locally attached to the operating system. In this manner, nodes 110 and 120 may access data blocks of storage media 131 and 141 through the operating system, rather than expressly requesting abstract files.

Network modules 112 and 122 may be configured to allow nodes 110 and 120 to connect with various systems, such as management system 150 and/or client system 160, over network connections provided by network 101 to allow such systems to access data stored in data storage sub-systems 103 and 104 and/or to otherwise provide communication with respect to other components of storage system 102. Moreover, network modules 112 and 122 may provide connections with one or more other components of system 100, such as through network 101. For example, network module 122 of node 120 may access data store device 130 via communication via network 101 and data module 113 of node 103. The foregoing operation provides a distributed storage system configuration for system 100.

System 100 of the illustrated embodiment includes one or more client system, represented here as client 160, for which access to and/or communication with storage system 102 is provided. For example, one or more such client may be provided data storage services by storage system 102. Accordingly, applications operable upon client 160 may interact with components of storage system 102 via network 101 to store data, access data, manage data, etc. It should be appreciated that, although referred to as clients, such client systems may comprise systems traditionally thought of as client systems (e.g., termination points for the data stored by data store devices 130 and 140) as well as systems traditionally thought of as server systems (e.g., systems providing data handling and/or management services to other systems).

System 100 may further include one or more management systems, represented here as management system 150, for providing management services with respect to storage system 102. Management system 150 may, for instance, communicate with nodes 110 and 120 across network 101 to control performance of various operations and to request information from or provide information to the nodes. In addition, management system 150 may be configured to receive inputs from and provide outputs to a user of system 100 (e.g., storage administrator) thereby operating as a centralized management interface between the administrator and system 100. It should be appreciated that, although management system 150 is illustrated as a single functional block, management system 150 of certain embodiments may comprise a number of systems, components, etc., such as a plurality of servers providing functionality as described herein.

Systems of embodiments provided access to and otherwise provided communication with storage system 102, such as management system 150 and client 160, comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. Although the systems of the illustrated embodiment are provided communication with components of storage system 102 via network 101, it should be appreciated that other embodiments of the present invention may employ different means of providing the requisite communication with respect to client systems and/or management systems herein.

Network 101 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. It should be appreciated that network 101 may comprise various forms, and even separate portions, of network infrastructure. For example, nodes 110 and 120 may be interconnected by cluster switching fabric 101b while nodes 110 and 120 may be interconnected to other systems, such as management system 150 and/or client system 160, by a more general data network (e.g., the Internet, a LAN, etc.).

As can be appreciated from the foregoing, system 100 provides a data storage system in which various digital data may be created, maintained, modified, and accessed (referred to collectively as data management). A logical mapping scheme providing logical data block mapping information, stored within and stored without the data structures, may be utilized by system 100 in providing such data management. For example, a file system implemented by data store devices 130 and 140 may implement a logical data block allocation technique. In an exemplary configuration of system 100, client 160 can utilize storage system 102 to store and retrieve data from volumes maintained by the file system implemented by data store devices 130 and 140. In such an embodiment, for example, client 160 can send data packets to N-module 122 in node 120 within data storage sub-system 104. Node 120 can forward the data to data store device 140 using D-module 123, where data store device 120 comprises the volume being accessed by client 160. In this way, in this example, the client can access the storage to store and/or retrieve data, using data storage sub-system 104 connected by network 101. Further, in this embodiment, client 160 can exchange data with N-module 112 in node 110 within data storage sub-system 103 (e.g., which may be remote from data storage sub-system 104). Node 110 can forward the data to data storage device 130 using D-module 113, thereby accessing one or more volume associated with the data storage device 130.

The foregoing data store devices each comprise a plurality of data blocks, according to embodiments herein, which may be used to provide various logical and/or physical storage containers, such as files, container files holding volumes, aggregates, virtual disks, etc. Such logical and physical storage containers may be defined using an array of blocks indexed or mapped either logically or physically by the file system using the appropriate type of block number. For example, a file may be indexed by file block numbers (FBNs), a container file by virtual block numbers (VBNs), an aggregate by physical block numbers (PBNs), and disks by disk block numbers (DBNs). To translate an FBN to a disk block, a file system (e.g., a WAFL file system) may use several steps, such as to translate the FBN to a VBN, to translate the VBN to a PBN, and then to translate the PBN to a DBN. Storage containers of various attributes may be defined and utilized using such logical and physical mapping techniques. For example, the aforementioned volumes may be defined to comprise aggregates (e.g., a traditional volume) and/or flexible volumes (e.g., volumes built on top of traditional volumes as a form of virtualization) using such logical and physical data block mapping techniques.

Figure 2:
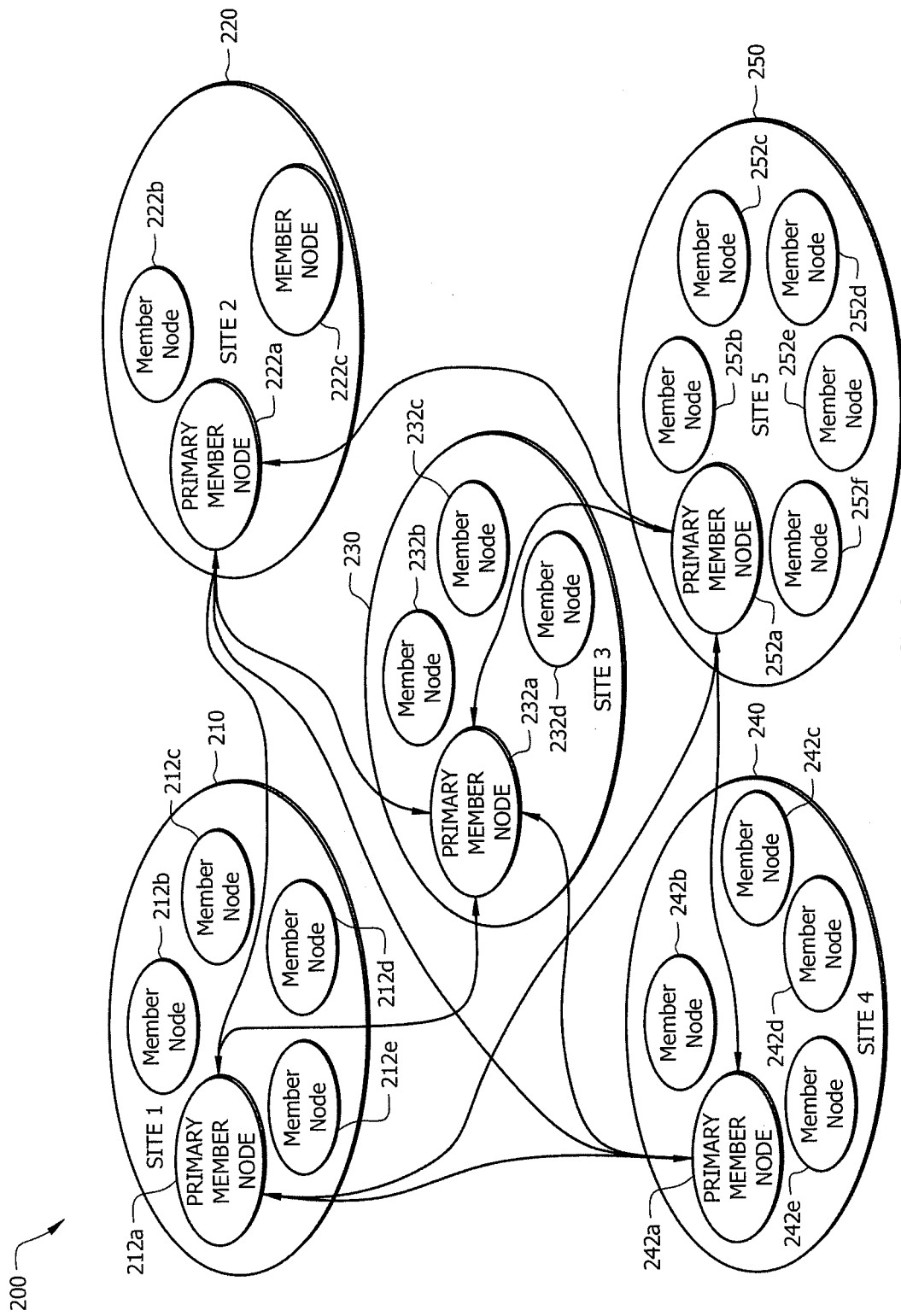
FIG. 2 shows a block diagram illustrating a cluster of sites for storing data according to one embodiment of the disclosure.

FIG. 2 shows a block diagram illustrating a cluster of sites for storing data according to one embodiment of the disclosure. A cluster 200 may include sites 210, 220, 230, 240, and 250. Each of the sites may comprise one or more nodes, such as the nodes 110 and 120 of FIG. 1. For example, sites 210, 220, 230, 240, and 250 may include nodes 212a-e, 222a-c, 232a-d, 242a-e, 252a-f. Each of nodes 212a-e, 222a-c, 232a-d, 242a-e, 252a-f may be coupled to data stores, such as the data stores 130 and 140 of FIG. 1. Although the nodes are shown grouped together into the sites of a cluster in FIG. 2, the nodes may be located in different geographical locations or in other logically-disparate or physically-disparate organizations. For example, the nodes may be members of different virtual local area networks (VLANs). Additionally, nodes 212a-e may be located at hosting centers at different physical locations, but still members of site 210. According to one embodiment, nodes in close proximity may be grouped into sites. According to another embodiment, nodes at a single physical location, such as a data center, may be organized into more than one site. Each of the nodes may store resources accessible by client devices through a network connection to cluster 200. For example, each of the nodes may provide a storage device or a redundant array of independent drives (RAID). The storage devices of each node may cooperate to present a large redundant storage device to outside clients. Clients may have access to all resources throughout cluster 200. Clients may also have restricted access to a portion of the resources within cluster 200. According to one embodiment, cluster 200 provides a remote storage device having a portion of storage space within cluster 200 reserved for each user of cluster 200.

One of the nodes of each of sites 210, 220, 230, 240, and 250 may be selected as a primary node. For example, node 212a, 222a, 232a, 242a, and 252a may be designated as primary nodes. The primary node may have the same hardware configuration as member nodes of the site, such that no special configuration of a node is necessary to become a primary node. However, certain primary nodes may have different hardware configurations. A single predetermined factor or a combination of factors may be employed in selecting a primary node for sites 210, 220, 230, 240, and 250.

For example, a primary node for each of sites 210, 220, 230, 240, and 250 may be selected based on the node identification number assigned to nodes of the sites. According to one embodiment, the node having the highest node identification number in each of sites 210, 220, 230, 240, and 250 may be selected as the primary node. In other embodiments, the lowest node identification number may select a primary node, a policy may be used to select a primary node, the primary node may be pre-identified, or nodes may be configured to not become a primary node. A node configured to not become a primary node may enter standby mode if it loses communication with the primary node and member nodes of the site, because the node would be configured to not become a primary node. A node may also be configured to not become a primary node but may also be programmed to become a temporary site in certain conditions.

In another example, a primary node for each of sites 210, 220, 230, 240, and 250 may be selected based on available bandwidth at each node of the site. According to one embodiment, the node having the highest available bandwidth in each of sites 210, 220, 230, 240, and 250 may be selected as the primary node. Additional factors may be used to assess a node's connection speed and reliability in addition to available bandwidth. For example, when selecting a primary node for sites 210, 220, 230, 240, and 250 each of the node's available bandwidth may be considered in addition to latency, assigned default gateway, and/or number of redundant connections. Because each node of a site may be located at physically different locations, the nodes may have significantly different quality of connections.

In a further example, a primary node for each of sites 210, 220, 230, 240, and 250 may be selected based on utilization of each node of the site. According to one embodiment, the node having the lowest utilization in each of sites 210, 220, 230, 240, and 250 may be selected as the primary node. Because each node may have different resources stored in a data store attached to the node, different numbers of clients may be accessing each node. For example, some nodes may have high-demand resources stored within an attached data store, and other nodes may have low-demand resources stored within an attached data store. The nodes with low-demand resources may be selected as a primary node to handle communications with other sites because of the nodes' higher availability.

Although the voting process for electing a new primary node is described above with reference to a change in node membership in a site, a new primary node may be selected at any time. For example, nodes in a site may intermittently or periodically re-evaluate the primary node and elect a new primary node. In another example, nodes in a site may continuously monitor the primary node and make decisions about whether to elect a new primary node.

In yet another example, a primary node for each of sites 210, 220, 230, 240, and 250 may be selected based on number of connections to other sites available to the node. As discussed above, each node may be physically separated from other nodes in the site. Thus, each node may have different connections available. According to one embodiment, the node having the most connections to primary nodes at other sites may be selected as the primary node. For example, node 212a in the site 210 may have a connection available to nodes 222a, 232a, and 242a of the sites 220, 230, and 240, respectively. On the other hand, node 212b may have a connection available to nodes 222a and 252a of the sites 220 and 250, respectively. In this example, node 212a would be elected as the primary node for the site 210. In another embodiment, the available connections may be weighted during selection of a primary node. For example, availability of a connection to node 252a of site 250 may be heavily weighted, such that the connection to node 252a is preferred over connection to nodes 222a, 232a, and 242a. Thus, the node 212b may be selected as the primary node for the site 210.

Primary nodes 212a, 222a, 232a, 242a, and 252a of sites 210, 220, 230, 240, and 250 may handle communications between each of sites 210, 220, 230, 240, and 250 with their respective site. For example, primary node 212a may communicate with primary nodes 222a, 232a, 242a, and 252a. Each of primary nodes 212a, 222a, 232a, 242a, and 252a may communicate with nodes within sites 210, 220, 230, 240, and 250, respectively. For example, primary node 212a may communicate with nodes 212b-e.

According to one embodiment, primary nodes 212a, 222a, 232a, 242a, and 252a coordinate to control cluster 200. For example, primary nodes 212, 222a, 232a, 242a, and 252a may communicate information regarding nodes present, and thus resources available, at each of sites 210, 220, 230, 240, and 250, respectively. The information may also include communications paths available to each of the nodes. The information may further include resources assigned to each node, such that when a node loses connection the resources previously assigned to the disconnected node may be reassigned.

Nodes within the cluster 200 may be in one of several states, and the state information for each node may be communicated between member nodes of a site with a primary node of the site. The primary nodes of each site may then communicate the state information for each node within its site to other primary nodes of other sites. Possible states for a node include a NeedConfig state, a DirectMode state, a ProxyMode state, a StandbyMode state, a Standby Primary state, a Primary state, and a TmpPrimary state. In the NeedConfig state, a node may not yet be configured and have blank assignments for a cluster, a group, and an assigned primary node. In the DirectMode state, a node may be able to communicate directly with the primary node of the site. In the ProxyMode state, a node may not be able to communicate directly with the primary node of the site, but may use another member node of the site as a proxy to communicate with the primary node of the site. In the StandbyMode state, a node may not be able to communicate with primary node of the site, other members of the site, or any other primary nodes of other sites. In the Standby Primary state, a node may be in standby mode and a primary node of a site, which does not become active until the primary node in standby regains communications. In the TmpPrimary state, a node may be capable of communicating with other primary nodes of other sites. In the Primary state, a node may be assigned as a primary node of a site or as an acting primary node if no other member nodes are available. According to one embodiment, the Primary state and the TmpPrimary state may be no different in function, but used to indicate to other primary nodes the status of the site. Operation of the node within each of the states is described below with reference to FIGS. 10-14.

Primary nodes 212a, 222a, 232a, 242a, and 252a may exchange information regarding the state of cluster 200. The information may be exchanged intermittently, at scheduled intervals, or after completion of certain events. For example, the primary node may transmit an updated state of the cluster to other primary nodes in communication with the primary node. The updated state may be transmitted periodically, such as every 15 minutes or 1 hour, or at random intervals. For example, a heartbeat message may be communicated from each primary node to other primary nodes. Additionally, a heartbeat message may be communicated from each primary node to other member nodes in the site. Updated state information may also be communicated when a state change occurs, such as a node being added to a site or a node being disconnected from a site. Further, updated state information may be communicated on request from another primary node or node.

Each of the primary nodes 212a, 222a, 232a, 242a, and 252a may acquire information regarding the state of the sites 210, 220, 230, 240, and 250, respectively, from member nodes in the sites and communicate the state acquired from other sites to the nodes in the site. According to one embodiment, the primary nodes 212a, 222a, 232a, 242a, and 252a intermittently or periodically ping the nodes 212b-e, 222b-c, 232b-d, 242b-e, 252b-f. Primary nodes 212a, 222a, 232a, 242a, and 252a know a change in the sites 210, 220, 230, 240, and 250, respectively, changes when one of the pings or heartbeats returns an error. According to another embodiment, the primary nodes 212a, 222a, 232a, 242a, and 252a intermittently or periodically receive heartbeat messages from the nodes 212b-e, 222b-c, 232b-d, 242b-e, 252b-f. When the primary nodes 212a, 222a, 232a, 242a, or 252a do not receive a heartbeat message from one of the nodes 212b-e, 222b-c, 232b-d, 242b-e, or 252b-f for a certain period of time, the primary node 212a, 222a, 232a, 242a, or 252a may determine the node has lost connection with site 210, 220, 230, 240, or 250, respectively.

The state of cluster 200 information may be used to build a view of the organization of cluster 200 and the location of particular resources within cluster 200. Primary nodes 212a, 222a, 232a, 242a, and 252a may distribute the information regarding the state of cluster 200 to each of nodes 212b-e, 222 b-c, 232b-d, 242b-e, 252b-f of sites 210, 220, 230, 240, and 250, respectively. Nodes may store the information regarding the state of the cluster 200 in memory, such as within the m-host 121, n-module 122, or d-module 123 of FIG. 1. Because each of nodes 212b-e, 222 b-c, 232b-d, 242b-e, 252b-f has information regarding the state of cluster 200, each of the nodes may assume a role as a primary node for a site, whether that be the primary node of the existing site or the primary node of a temporary site formed when the node becomes disconnected from the existing site.

According to one embodiment, nodes may store both static information and dynamic information. Static information may include configuration information, such as site number and site membership. Dynamic information may include network information, such as the states of member nodes, primary nodes, connections, and time of last update. The dynamic data stored on each node may be different. For example, not every node may store the entire status of all nodes in the cluster. Instead, each member node may have information only regarding other members of the site.

When a node is added to an existing site in a cluster, the primary node may handle addition of the node to the cluster. The primary node may assign the new node a unique node identification number and/or an address for network communications. The primary node may also perform other configuration of the node such as, for example, installing policies. Additionally, the primary node may notify other nodes within the site and the primary nodes of other sites regarding the addition of the node. As discussed above, the update of the information may take place during one of the intermittent or periodic updates or the update of the information may take place immediately upon the addition of the node to the site.

According to one embodiment, a primary node may handle addition of a node to a site to improve security of the cluster. For example, an administrator may assign a node basic settings, such as a network address and a site the node should belong to. The primary node may then assign an identification to the node. A node identification may be unique in the site, but not unique across sites. That is, the identifier of the node may be made up from a site number and an identification number.

When a node is removed from an existing site in a cluster, the primary node may handle the removal of the node from the cluster. The primary node may remove all configuration data stored in the node, such as by resetting the configuration to a default value or erasing the configuration. Additionally, the primary node may notify other nodes within the site and the primary nodes of other sites regarding the removal of the node. As discussed above, the update of the information may take place during one of the intermittent or periodic updates or the update of the information may take place immediately upon the removal of the node from the site. If the node being removed is a primary node, a new primary node may be selected for the site before the node is removed. The newly elected primary node may complete the removal of the node.

The configuration loaded on a node may include a node identification number. The node identification numbers may be assigned based on a level of the cluster, the level of the site, and the level of the node. According to one embodiment, the configuration may be a value having three fields, where each field is represented by two bytes. The first field, or first group of bytes, may include a cluster identification number. The second field, or second group of bytes, may include a site identification number. The third field, or third group of bytes, may include a node identification number. Although one particular configuration is described, the size of the fields and the number of the fields may be increased to accommodate additional unique identifiers.

Figure 3:
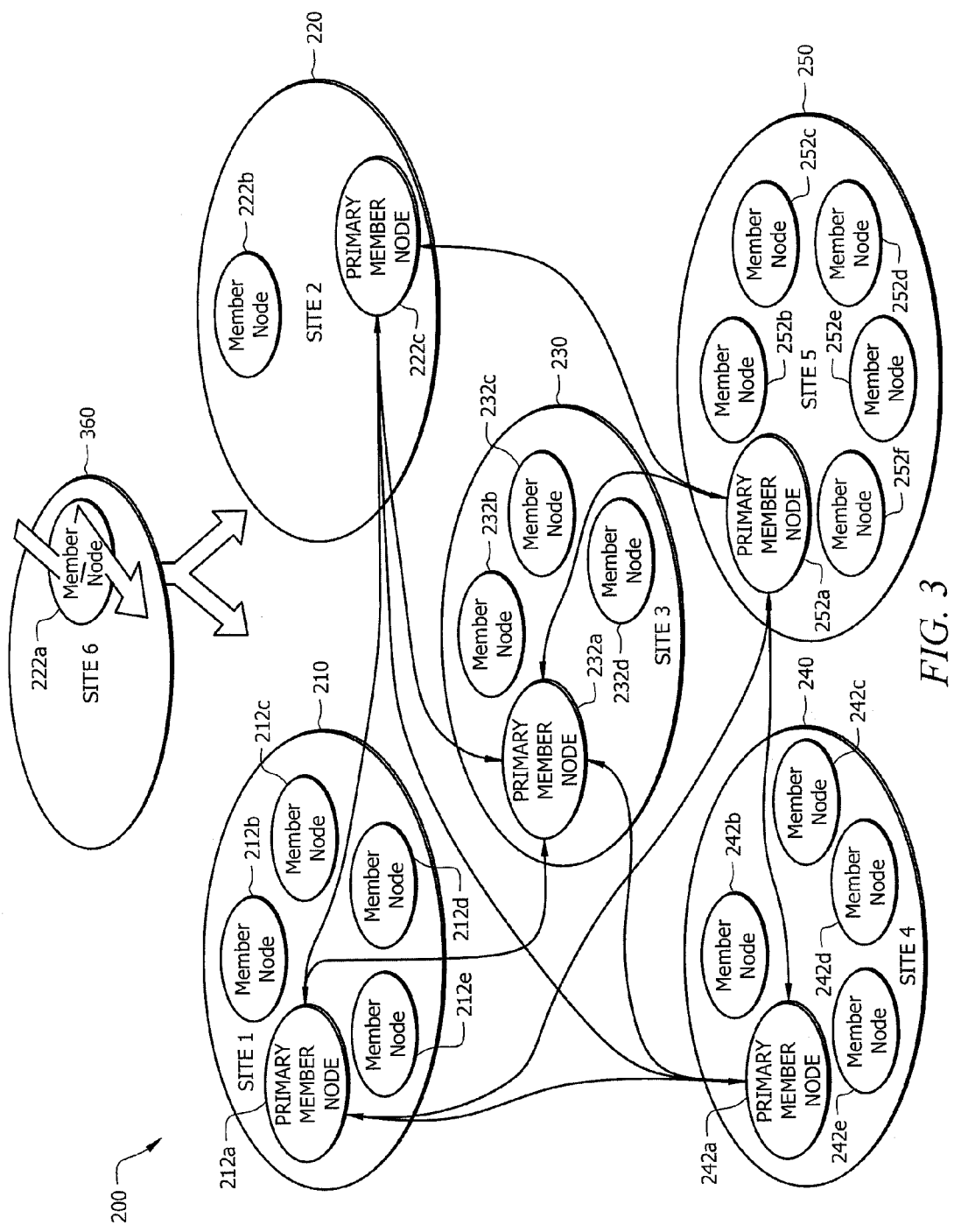
FIG. 3 shows a block diagram illustrating a cluster of sites for storing data after one primary node fails according to one embodiment of the disclosure.

When a primary node becomes unavailable, a new primary node may be elected to assume responsibilities for communications between the site and other sites. FIG. 3 shows a block diagram illustrating a cluster of sites for storing data after one primary node fails to communicate with any node in the site 220 according to one embodiment of the disclosure. Primary node 222a may become disconnected from site 220. After nodes 222b-c lose communication with primary node 222a, the nodes may attempt to establish communication with each of the other member nodes of site 220. After communications are reestablished between nodes 222b-c, nodes 222b-c may form a temporary site and elect a new primary node. The new primary node may be selected based on the node identification number as described above or the new primary node may be selected based on other criteria. For example, the node 222c may be promoted to act as primary node for site 220. After the node 222c is selected as a new primary node, node 222c may establish communications with other sites 210, 230, 240, and 250. That is, primary node 222c may establish communications with primary nodes 212a, 232a, 242a, and 252a.

After primary node 222a is disconnected from other nodes, primary node 222a creates a new site 360. Primary node 222a may become the primary node of new site 360 and may attempt to establish communications with other sites 210, 220, 230, 240, and 250. If other nodes from site 220 lose communication with nodes 222b-c but remain in communication with primary node 222a, then the other nodes may also become part of new site 360. The site 360 may be a non-temporary site, because the site 360 retained the primary node 222a. According to one embodiment, when site 360 is formed by the node, the identification number of the node may be used as the site identification. When the node's identification number is unique, other nodes may recognize the node is in a temporary site when the site identification number matches the node identification number. Because site 220 lost primary node 222a, a new primary node may be elected and site 220 may become a temporary site.

If a primary node of a temporary site loses communication with other nodes, the primary node may remain a primary node of a temporary site. Member nodes that lose communication to the primary node of the temporary site may form another temporary site and elect another primary node. Thus, there may be more than one temporary site, each having its own primary node, even though initially only one primary node was a member of the non-temporary site.

If more than one node, whether primary node or member nodes, lose communication, then the disconnected group of nodes not having a primary node may form a temporary site. The member nodes connected to the primary node may remain a non-temporary site. If a single member node fails, the member node may form a temporary site unless configured otherwise.

As described above, nodes may lose communications with other nodes but attempt to reestablish communications. If a primary node fails permanently, such as in a disaster, the primary node may not be able to join the original site and the member nodes will form one or more temporary sites. The disaster node may then be removed from the cluster. If the member nodes formed a single temporary site, the temporary site may transition to a non-temporary site. If more than one temporary site was formed, the sites may remain temporary sites until the temporary sites merge into a single site, which may then transition to a non-temporary site.

Although temporary and non-temporary sites are described above, there may be no functional or physical difference between temporary and non-temporary sites. According to one embodiment, the difference between a temporary site and a non-temporary site may be the identification of the site to allow identifications of sites to remain unique across a cluster.

According to one embodiment, the identification number may be formatted as: <cluster><tmp><site><tmp><node>. A cluster-wide unique identification number may be generated for the site and each node. For example, cluster 22, site 11, and node 88 may have identification number 2200110088. If this node forms a temporary site, then the node identification number of the first primary node in this temporary site may be used in the tmp fields such as 2200118888. If a new member node with identification number 99 from the same site also joins the temporary site, it may receive the identification number 2200118899. This selection of identification numbers may allow unique identification even when new temporary sites are formed.

Primary node 222a of site 360 may attempt to establish communication with other nodes. For example, node 222a may attempt to reestablish communication with the nodes 222b and 222c of site 220. In another example, node 222a may attempt to establish communication with other primary nodes, such as primary nodes 212a, 222c, 232a, 242a, and/or 252a. If communication with at least one other primary node is successful, then the site 360 becomes established. That is, at least one other primary node will have a communication path to the site 360, and that primary node will inform other primary nodes of other sites as to the presence of new site 360 through intermittent, periodic, and/or event-triggered updates as discussed above. If node 222a can communicate with node 222b or node 222c, then the node 222a may rejoin site 360. Node 222a may communicate with the primary node directly in direct mode. If node 222a cannot communicate with the primary node but can communicate to another member node, then node 222a may join in proxy mode. When all member nodes are rejoined to a temporary site, either through direct or proxy mode, the temporary site may transition back to a non-temporary site.

When the node 222a is unsuccessful reestablishing communication with any other node, the node 222a may enter a standby primary mode. In standby mode, node 222a may continue to attempt communications with a primary node. The loss of connection with the node 222a may be communicated to the other sites 210, 230, 240, and 250 of cluster 200 by new primary node 222c. Along with the loss of connection, the other sites 210, 230, 240, and 250 may be notified of the new election of node 222c as primary node for site 220. When the node 222a shuts down, the resources previously available to clients from the node 222a may be reassigned to another node. For example, node 222b may be assigned to take over the resources. However, the newly-selected node need not be from the same site. According to one embodiment, cluster 200 may operate as a redundant data store of the resources and data corresponding to the resources may be copied or moved from various locations in the cluster 200 to the node 222b. According to another embodiment, each node in cluster 200 stores identical copies of data and little to no transfer of data is necessary to reassign resources to node 222b. According to one embodiment, assignment of resources may be changed between nodes without physically moving the data, such as when a data store is accessible by multiple nodes.

Figure 4:
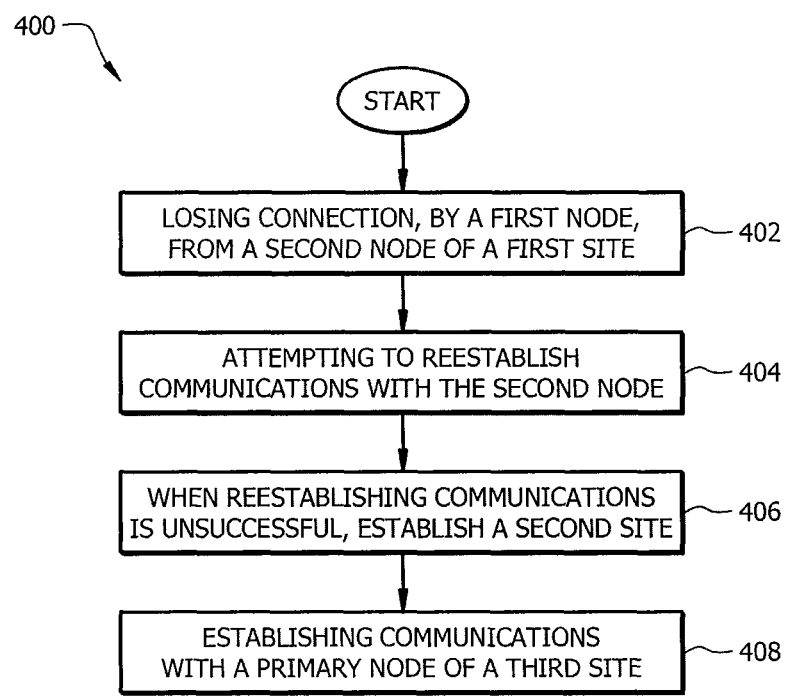
FIG. 4 shows a flow chart illustrating a method of handling a node failure according to one embodiment of the disclosure.

FIG. 4 shows a flow chart illustrating a method of handling a node failure according to one embodiment of the disclosure. A method 400 begins a block 402 with losing connection, by a first node and/or additional nodes, from a second node of a first site. The connection may be lost due to a failed communication link or an intentional disconnection. For example, node 222a may lose communications with other nodes 222b-c of site 220. At block 404, the first node attempts to reestablish communications with the second node. At block 406, when the attempt to reestablish communications fails, the first node creates a second site. The second site may include the node that lost communications as well as any other nodes in communication with the first node that also lost communications with the first site. At block 408 after establishing the second site, the first node establishes communications with a primary node of a third site. According to one embodiment, the primary node of the third site may be another node of the second site. In another embodiment, the primary node of the third site may be a primary node of a site other than the site the first node disconnected from. For example, node 222a of new site 360 may establish communications with node 232a of site 230. Node 222a may communicate with other sites through the primary node of the third site.

Figure 5:
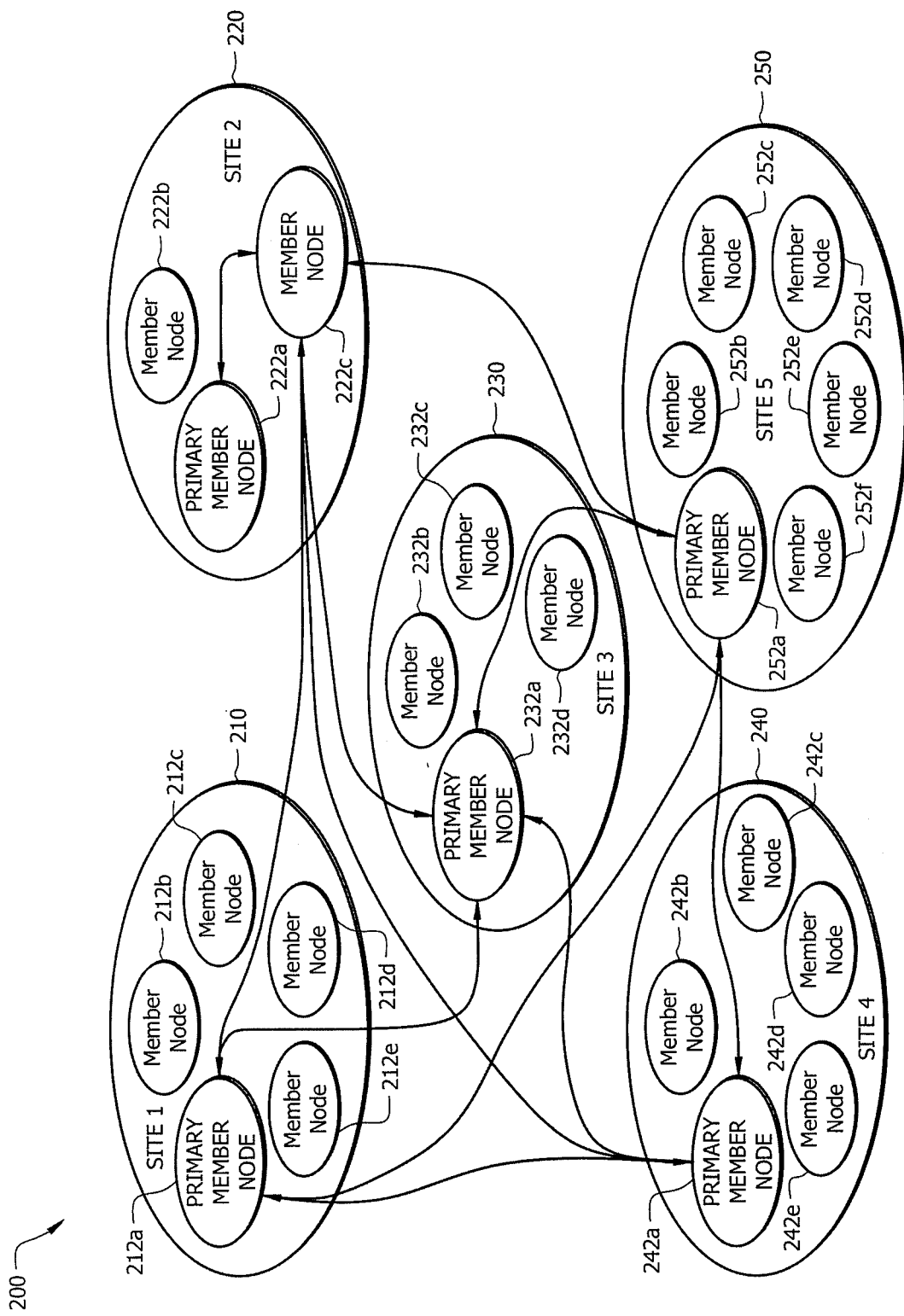
FIG. 5 shows a block diagram illustrating reconnection of a disconnected node to a site according to one embodiment of the disclosure.

FIG. 5 shows a block diagram illustrating reconnection of a disconnected node to a site according to one embodiment of the disclosure. Node 222a of new site 360 may continue to attempt to reestablish communication with site 220. When node 222a is successful in reestablishing connection to new primary node 222c of site 220, node 222a may rejoin site 220. When node 222a rejoins site 220, a new election of a primary node may begin in site 220. The election may select the primary node with the highest node identification. According to one embodiment after the election, node 222a may resume as primary node of site 220. According to one embodiment, when node 222a rejoins site 220, node 222a will join in direct or proxy mode. The current primary node of site 220 remains the primary node, and an election of another primary node may follow. If site 220 was a temporary site, then site 220 may transition to a non-temporary site when all member nodes are rejoined.

Other policies may be in place within site 220 for selecting a primary node when a node joins site 220. For example, one policy may disfavor selecting a node as a primary node when the node has disconnected several times from site 220. That is, less reliable nodes may be less likely to be selected as primary nodes. When node 222a rejoins site 220, the policy within site 220 may be consulted along with a log of activity within site 220 to select a primary node. The activity log may include information regarding changes in the view of the cluster over time. For example, the activity log may indicate when other nodes in the site are part of the cluster and when other nodes in the site lose connection with the cluster. The activity log of each of nodes 222a-c may also be consulted during election of a primary node and used, in part, as a basis for selecting a primary node. For example, a node with less activity may be preferred as a primary node to more evenly distribute workload between nodes in site 220.

Figure 6:
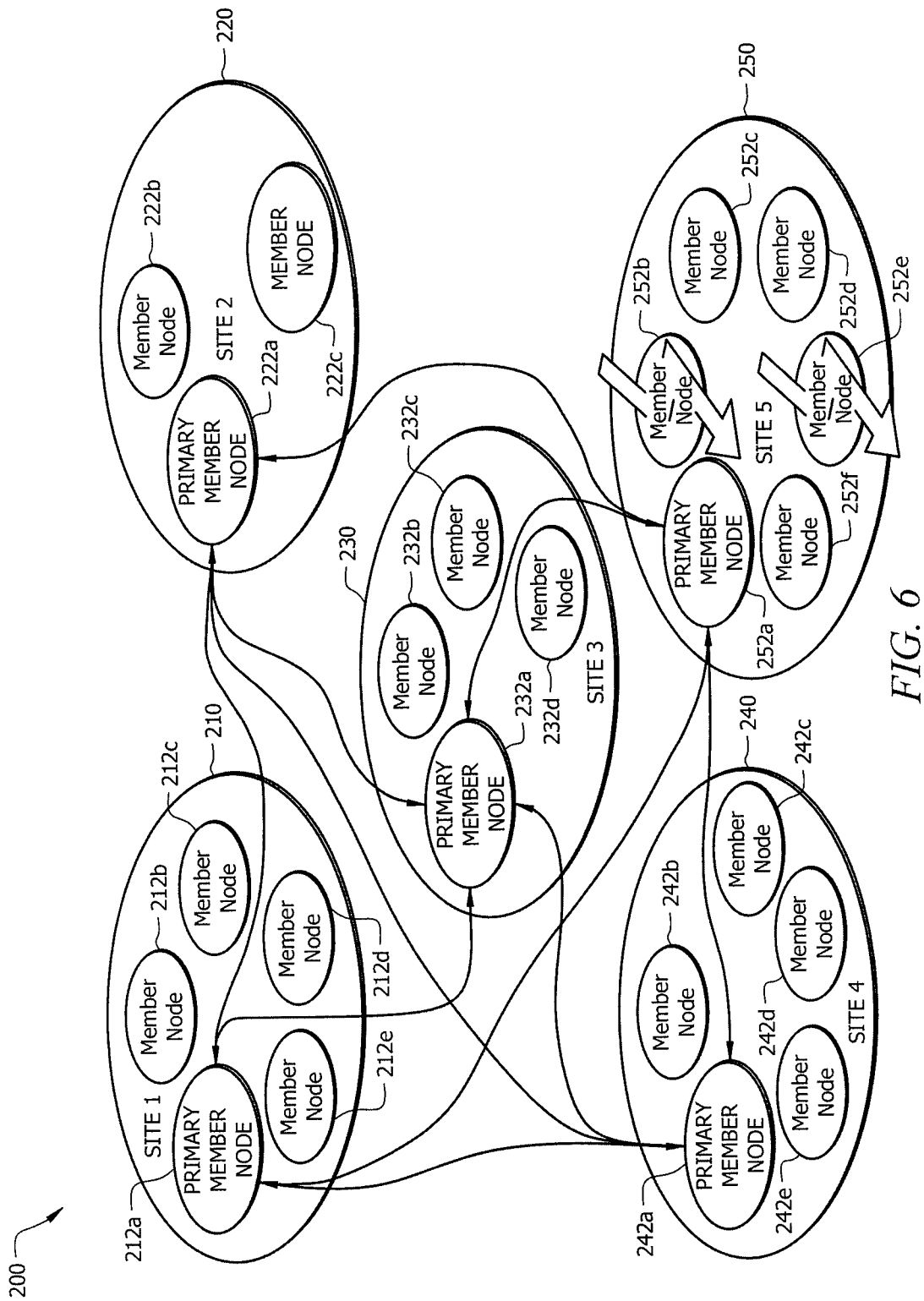
FIG. 6 shows a block diagram illustrating disconnection of a node from a site according to one embodiment of the disclosure.

FIG. 6 shows a block diagram illustrating disconnection of a node from a site according to one embodiment of the disclosure. Nodes 252b and 252e may lose connection with other nodes 252a, 252c-d, and 252f from site 250. The disconnection may be due to a failure in nodes 252b and 252e, such as a power failure, or in a communications path from nodes 252b and 252e to primary node 252a of site 250. When nodes 252b and 252e lose connection with the primary node 252a, the nodes 252b and 252e may initially attempt to establish communication with the primary node 252a through one of the other nodes 252c-d and/or 252f to the primary node 252a. That is, the other nodes 252c-d and/or 252f may serve as a proxy for the nodes 252b and 252e.

Figure 7:
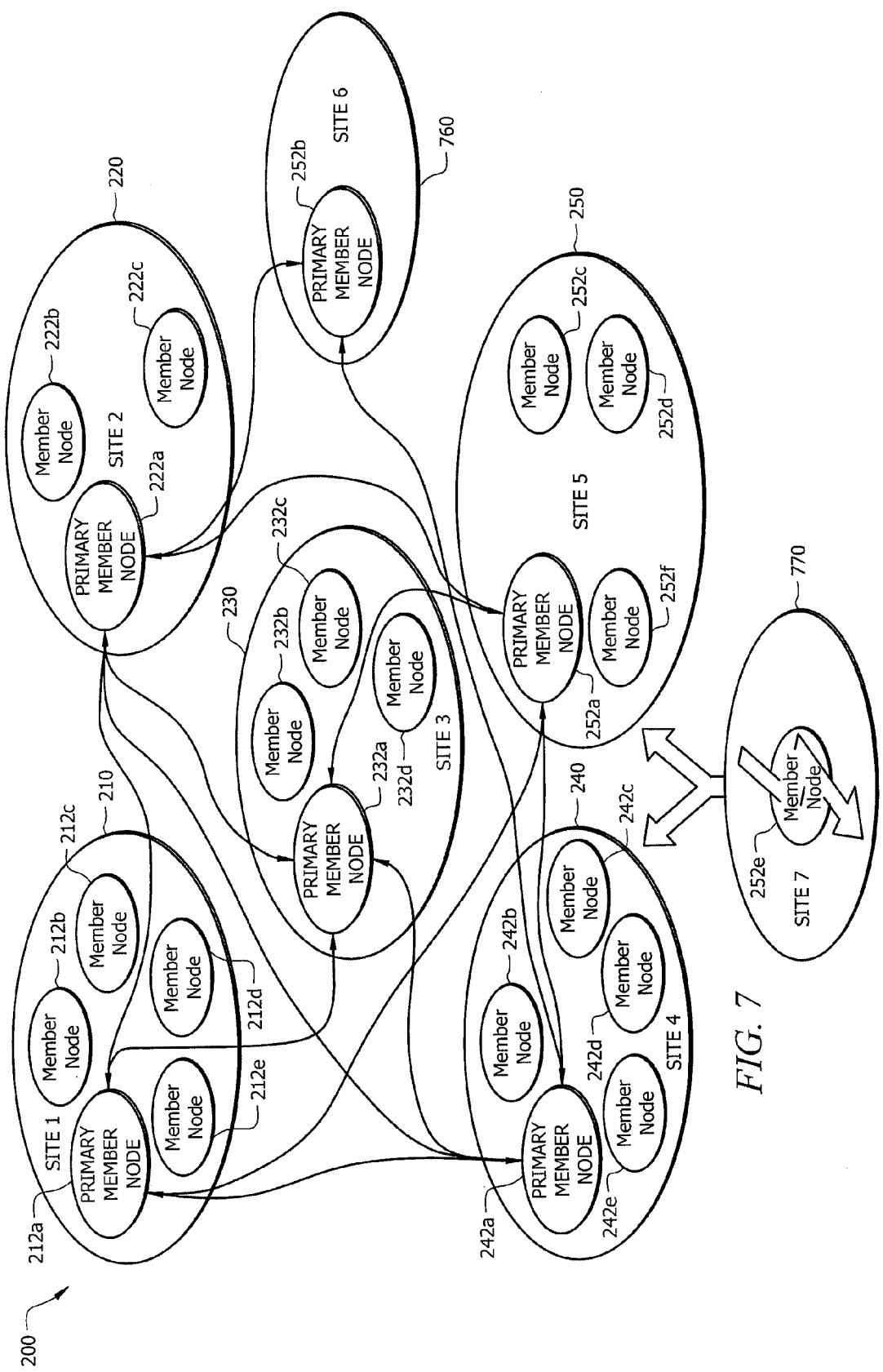
FIG. 7 shows a block diagram illustrating disconnecting nodes establishing new sites according to one embodiment of the disclosure.

When nodes lose connection from the primary node of the site and are unable to establish communications with the primary node 252a, the nodes may establish new sites and attempt to reestablish communications with other sites in the cluster. Because site 250 did not lose primary node 252a, site 250 may remain a non-temporary site. FIG. 7 shows a block diagram illustrating disconnecting nodes establishing new temporary sites according to one embodiment of the disclosure. Node 252b may establish new site 760, and node 252e may establish a new site 770. Nodes 252b and 252e start an election process for sites 760 and 770, respectively, and are selected as primary nodes for sites 760 and 770, respectively. As primary nodes, nodes 252b and 252e attempt to reestablish communications with primary nodes 212a, 222a, 232a, 242a, and 252a of sites 210, 220, 230, 240, and 250. Node 252b may reestablish communications with nodes 222a and 242a of sites 220 and 240, respectively. Although node 252b may have only a direct communication path to sites 220 and 240, node 252b may communicate with other sites through sites 220 and 240. That is, nodes 222a and 242a may act as proxies for node 252b to communicate with sites 210, 230, and 250.

Node 252e of new site 770 may be unable to reestablish communications with other sites of cluster 200. In particular, the node 252e may be unable to reestablish communications with any of the primary nodes 212a, 222a, 232a, 242a, and 252a. If node 252e is unable to reestablish communications, node 252e may enter standby mode. The resources available from node 252e may then be reassigned to other nodes throughout collection 200. According to one embodiment, nodes 252a, 252c, 252d, and 252f of site 250 from which disconnected node 252e was a member may be reassigned to the resources available on node 252e. For example, when primary node 252a of site 250 receives a request for a resource on disconnected node 252e, primary node 252a may redirect the request to one of nodes 252a, 252c, 252d, and 252f. All primary nodes in a cluster may be involved in assigning resources to nodes within the cluster.

Nodes 252b and 252e may continue to attempt to reestablish communication with site 250. When communications are reestablished, nodes 252b and 252e may rejoin site 250 and may cause an election of a new primary node for site 250, as described above. Primary nodes may then decide how resources are reassigned.

Figure 8:
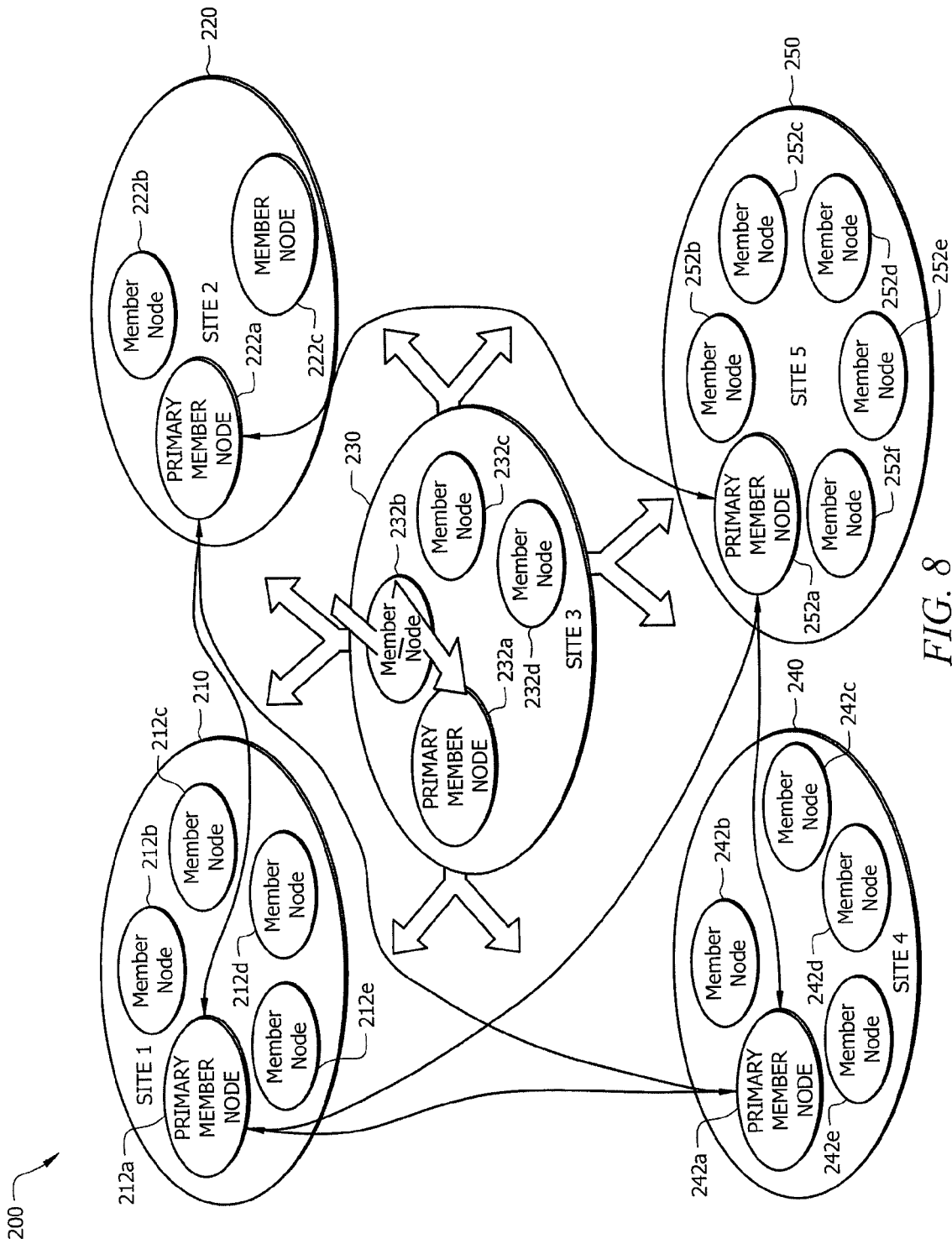
FIG. 8 shows a block diagram illustrating disconnection of a site from a cluster according to one embodiment of the disclosure.

FIG. 8 shows a block diagram illustrating disconnection of a site from a cluster according to one embodiment of the disclosure. Site 230 may disconnect from cluster 200 due to a hardware failure within one of nodes 232a-d or due to a network communications failure between site 230 and other sites 210, 220, 240, and 250. Each of nodes 232a-d may attempt to reestablish communications with other sites 210, 220, 240, and 250 of cluster 200. If the communications are not reestablished, site 230 may enter standby mode.

When other sites 210, 220, 240, and 250 detect the disconnection of the site 230, primary nodes 212a, 222a, 242a, and 252a may attempt to reconnect to primary node 232a. If reconnection with primary node 232a is possible, then site 230 may continue to operate. When the connection fails, primary nodes 212a, 222a, 242a, and 252a may attempt to reconnect with nodes 232b-d. If connection to any of nodes 232b-d is successful, then nodes 232b-d to which connection was successful may become the primary node of site 230 and site 230 may continue to operate. When connection with none of nodes 232a-d is possible, the resources stored within nodes 232a-d of site 230 may be redistributed to other nodes of sites 210, 220, 240, and 250.

Figure 9:
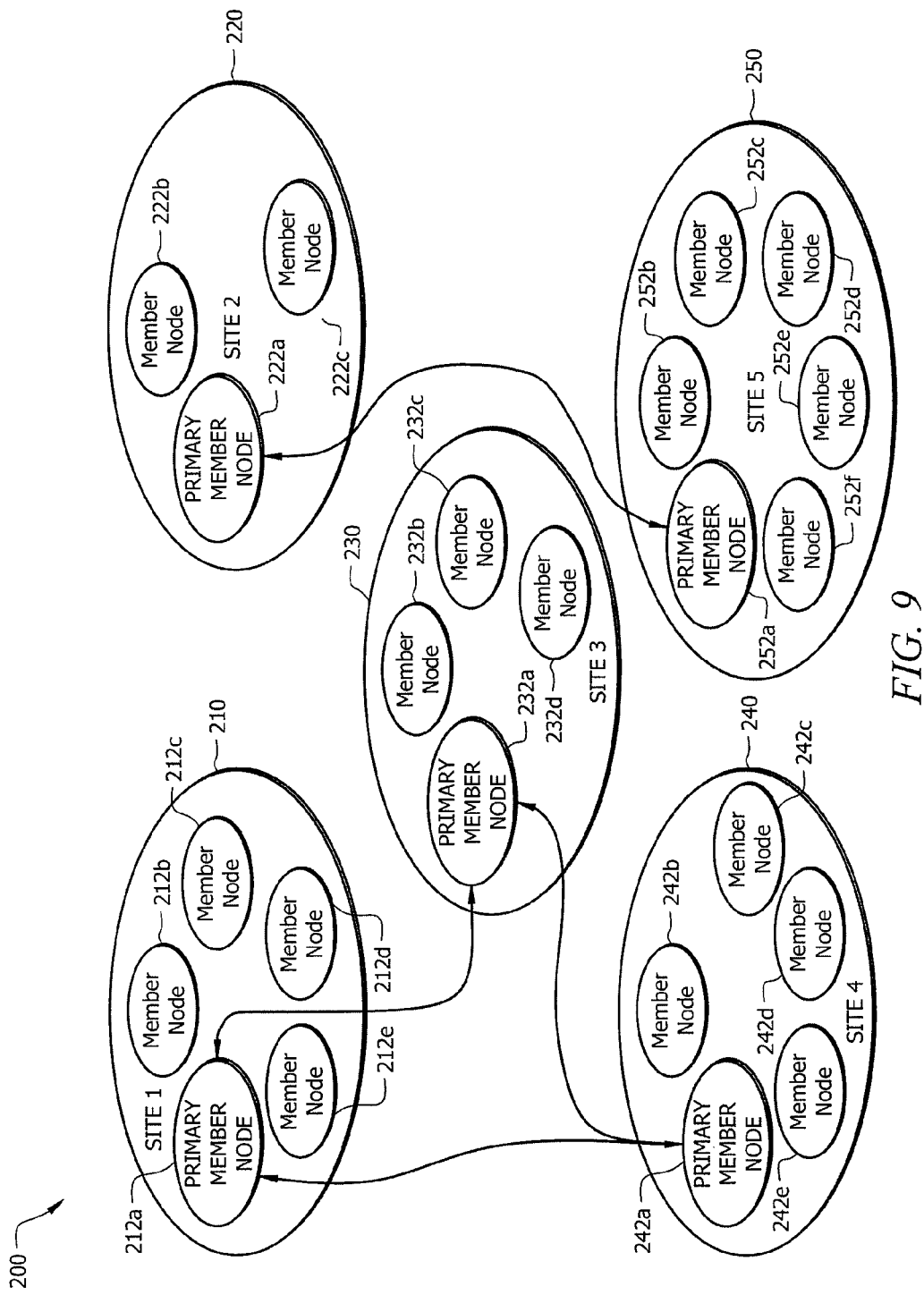
FIG. 9 shows a block diagram illustrating disconnection of two sites from a cluster according to one embodiment of the disclosure.

FIG. 9 shows a block diagram illustrating disconnection of two sites from a cluster according to one embodiment of the disclosure. Sites 220 and 250 may be disconnected from other sites 210, 230, and 240 due to a hardware failure and/or a network communications failure. When two sites disconnect from cluster 200, sites 210, 230, and 240 may not redistribute resources from sites 220 and 250. Because sites 220 and 250 remain operational, redistribution of resources contained in nodes 222a-c and 252a-f may not be necessary. Sites 220 and 250 may attempt to reestablish communication with sites 210, 230, and 240. According to one embodiment, manual intervention may be taken to reconnect sites 220 and 250 to cluster 200. Other situations may cause resources to not be redistributed. For example, both sites may be down due to power failure or disaster or a lost connection. If the sites are down, then the resources are not available and manual intervention may be necessary. If both sites remain active, then all resources may remain available, and the sites may operate separately.

Flow charts for operations of member nodes and primary nodes are presented below for the cluster configurations described above. The operation of the flow charts may be stored in memory within the nodes as program code and executed by a processor within the node. Although particular sequences are described with reference to FIGS. 10-14, the steps may be performed in a different order from the sequences described in FIGS. 10-14.

Figure 10:
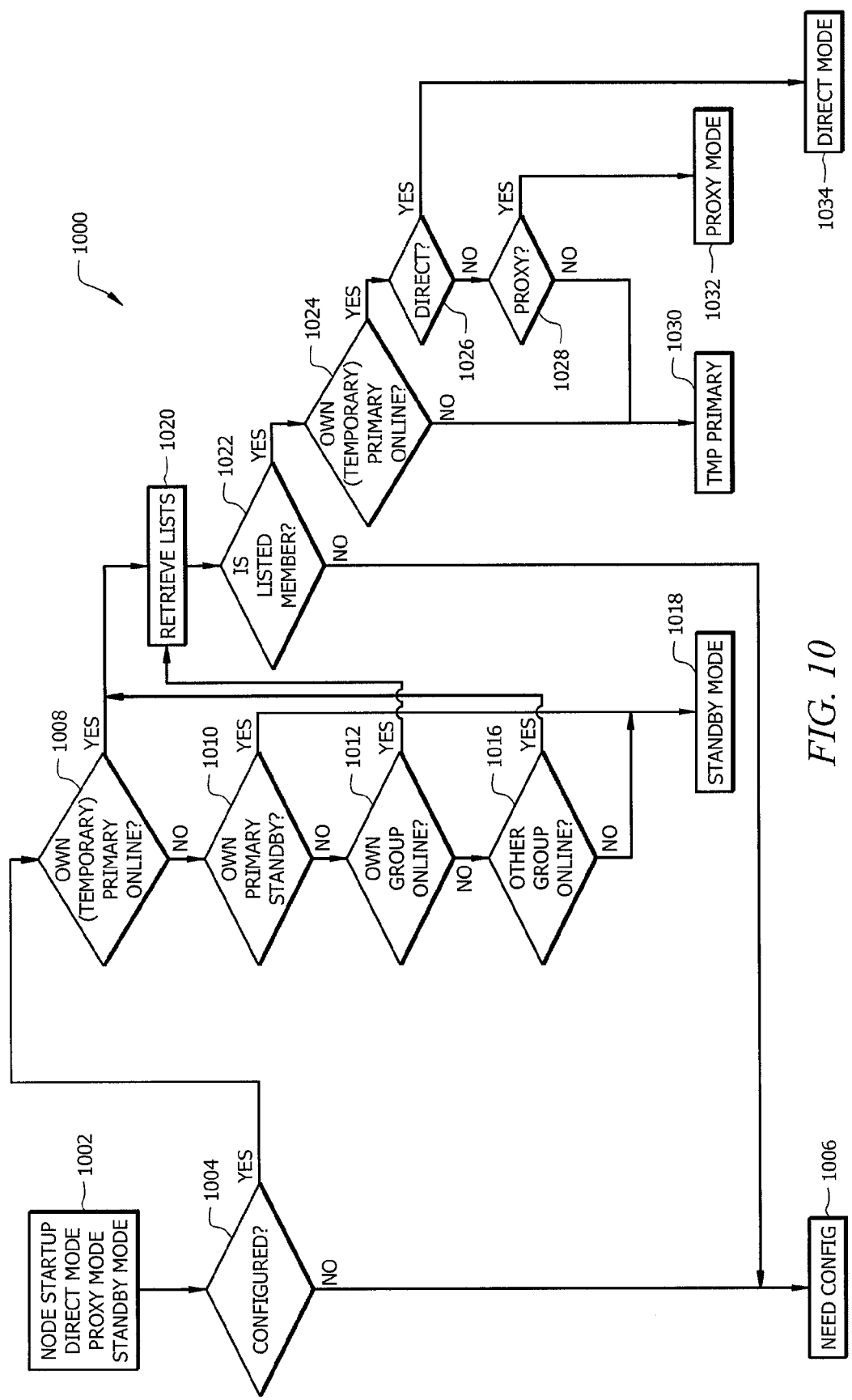
FIG. 10 shows a flow chart illustrating a state diagram for a node checking the state of other nodes according to one embodiment of the disclosure.

A node may monitor the status of nodes in a cluster and change its own state as appropriate. FIG. 10 shows a flow chart illustrating a state diagram for a node checking the state of other nodes according to one embodiment of the disclosure. A method 1000 begins at method 1002 with node startup in either a direct mode, a proxy mode, or a standby mode. At block 1004, the node checks for configuration data in memory. If no configuration data exists, then the method 1000 proceeds to block 1006 to wait for configuration data. If the node is configured, then the method 1000 proceeds to block 1008 to determine if the node's primary node or a temporary primary of the site is online. If the primary is online, the node may contact the primary node. If not, the node may contact the temporary primary node.

If the node's primary node is not online, the node checks for a primary node in primary standby mode at block 1010. If a standby primary node is found, then the node enters standby mode at block 1018. If no primary standby node is found, then the node checks for member nodes of its assigned site at block 1012. If member nodes are found, then the lists may be retrieved at block 1020. If no member nodes are found, the node determines if other member nodes are online at block 1016. If no member nodes are detected, then the node enters standby mode at block 1018.

If member nodes are identified at block 1016 or another primary node is available at block 1008, then lists are retrieved for the site at block 1020. If the node is not a listed member at block 1022, then the node determines configuration is needed at block 1006. If the node is a listed member of the site, then the node determines if the primary node or the temporary primary node for the site is online at block 1024. If the primary node is not online, then the node enters temporary primary state at block 1030. If the primary node for the site is online, then the node determines if direct communications to the primary node are possible at block 1026. If direct communications are possible, then the node enters direct mode at block 1034. If direct communications are not possible, then the node determines if proxy communications are possible at block 1028. If proxy communications are possible, then the node enters proxy mode at block 1032 by communicating through another member node to reach the primary node. If proxy communications are not possible, then the node enters temporary primary state at block 1030. Then, the node becomes a primary node of a new temporary site and attempts to establish communications with other primary nodes.

Figure 11:
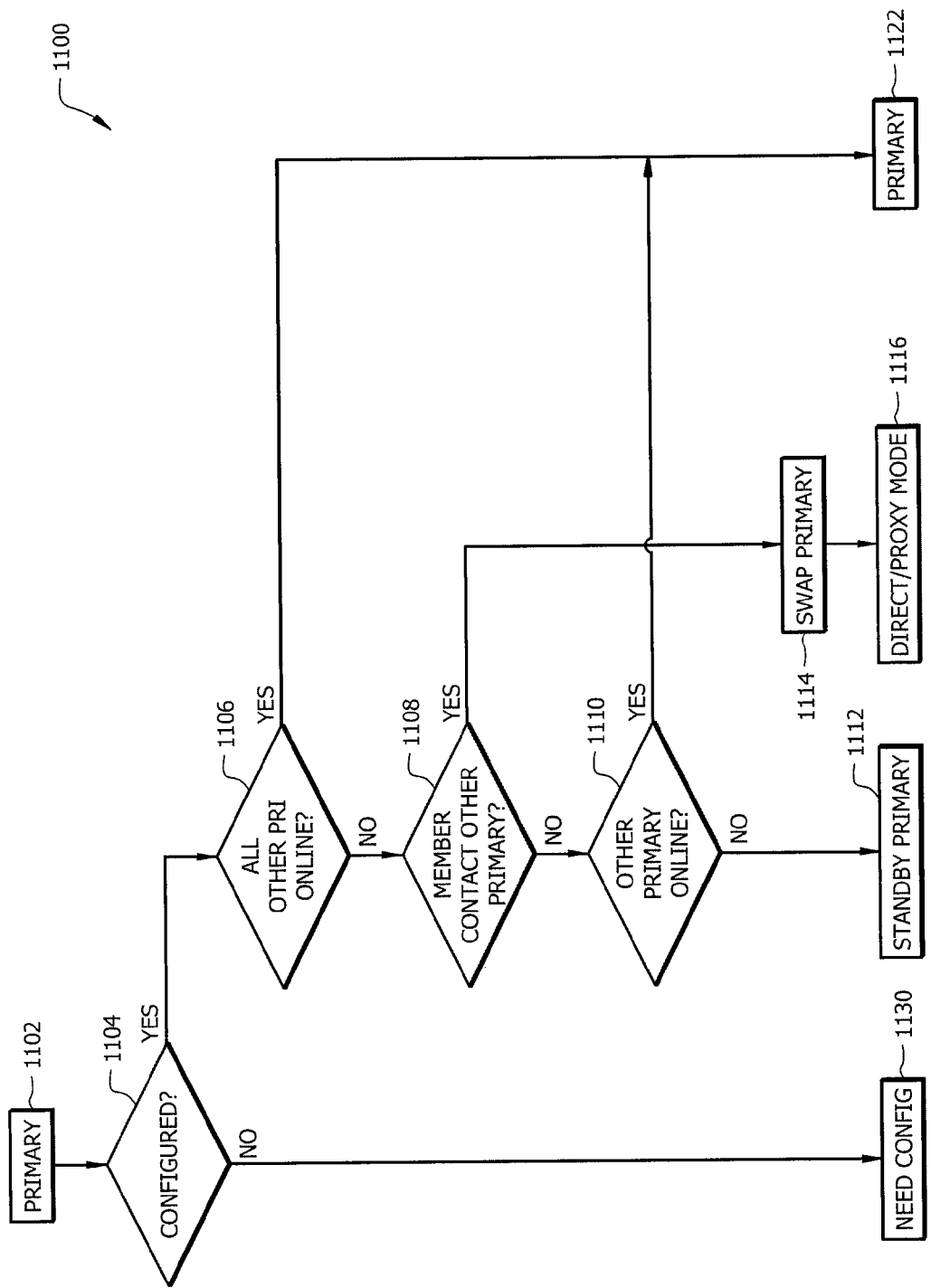
FIG. 11 shows a flow chart illustrating a state diagram for a node checking a primary node against other primary nodes according to one embodiment of the disclosure.

When a node is operating as a primary node in a primary state, then the node may perform checks to determine if the node should remain a primary node. FIG. 11 shows a flow chart illustrating a state diagram for a node checking a primary node against other primary nodes according to one embodiment of the disclosure. A method 1100 begins at block 1102 with entering a primary state. At block 1104, it is determined whether the node is configured. If not configured, the node proceeds to block 1130 to wait for configuration data. If configured, the node proceeds to block 1106 to determine if all other primary nodes in the cluster are online.

If so, the primary node remains a primary node at block 1122. If not, the method 1100 proceeds to block 1108. If another member node may contact other primary nodes at block 1108, the primary role may be swapped to this node at blocks 1114 and 1116. If not, the primary node determines whether any other primary node is reachable at block 1110. If so, then the primary node remains a primary node at block 1122. If not, the primary node enters primary standby mode at block 1112.

Figure 12:
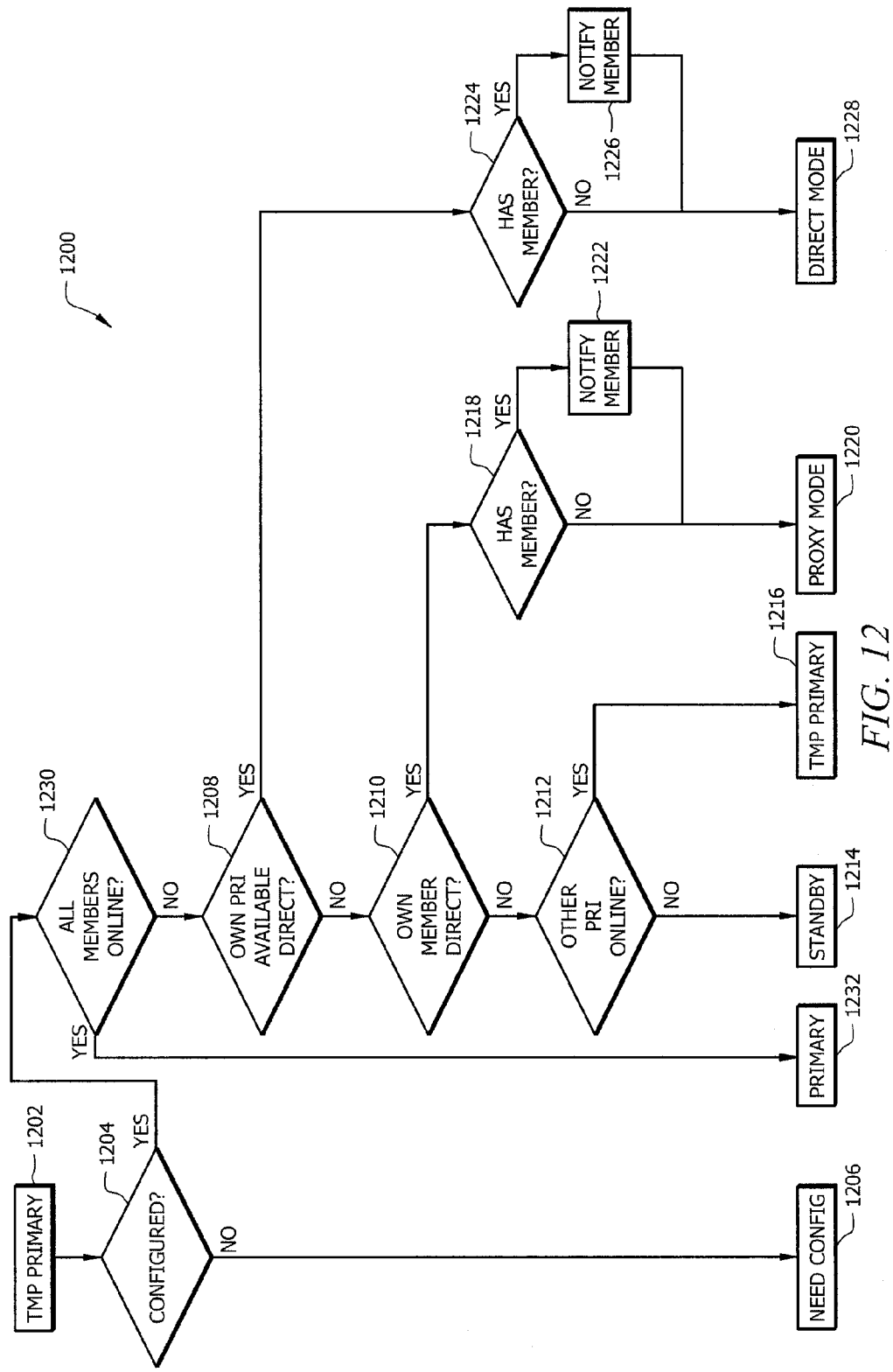
FIG. 12 shows a flow chart illustrating a state diagram for a node acting as a temporary primary node checking for other primary nodes according to one embodiment of the disclosure.

When a node is operating as a temporary primary node the node may perform checks to determine if the nodes should change states. FIG. 12 shows a flow chart illustrating a state diagram for a node acting as a temporary primary node checking for other primary nodes according to one embodiment of the disclosure. A method 1200 begins at block 1202 with a node operating as a temporary primary node. At block 1204, the node determines whether it is configured and, if so proceeds to block 1230. If not configured, the node proceeds to block 1206 to wait for configuration data.

At block 1230, the node may check if all members are online. If so, then the temporary primary node becomes a primary node at block 1232, and the site transitions from a temporary site to a non-temporary site. At block 1208, the node checks if a primary node assigned to the site is available for direct communications. If so, the node determines, at block 1224, whether there are member nodes assigned to its temporary site. If so, the node notifies member nodes of the new primary node availability at block 1226 and, then, switches to direct mode as block 1228. If no member nodes are assigned to the temporary site at block 1224, then the node switches to direct mode at block 1228.

If the primary node of the non-temporary site is not directly available at block 1208, then the node determines if another member node is available through another member's direct communications at block 1210. If so, the temporary primary node determines at block 1218 if it has assigned member nodes in the temporary site. If so, the temporary primary node notifies member nodes of the other member node availability at block 1222 and, then, switches to proxy mode at block 1220. If no member nodes are assigned to the node at block 1218, then the node switches into proxy mode at block 1220.

If no primary node is available through another member node, the node determines at block 1212 whether another primary node is reachable. If so, the node remains a temporary primary node at block 1216. If no other primary node is reachable, then the node switches into standby mode at block 1214. In temporary mode, the node may repeat method 1200.

Figure 13:
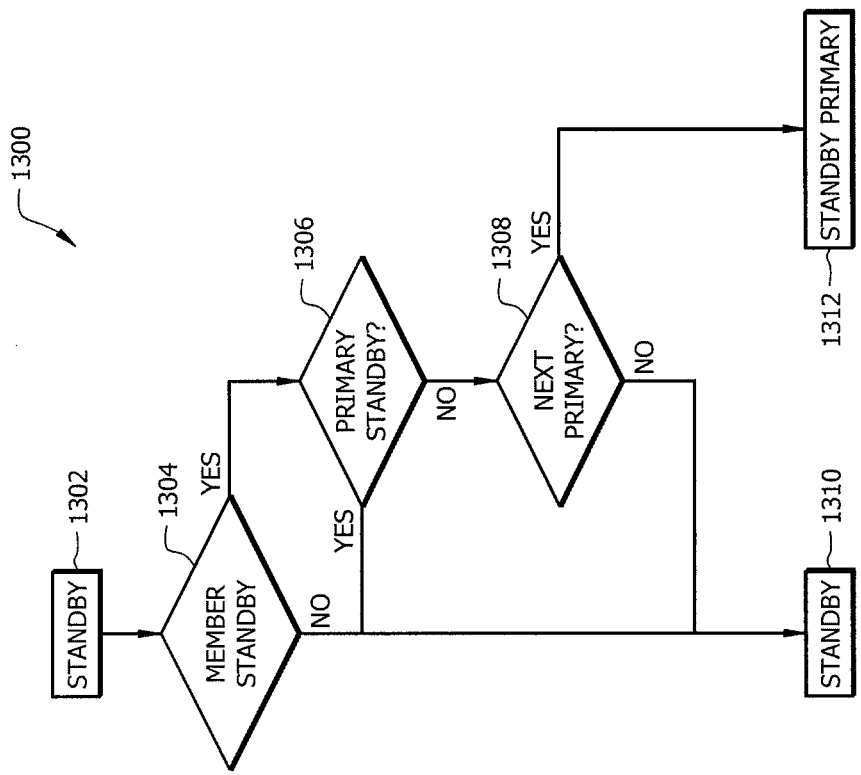
FIG. 13 shows a flow chart illustrating a state diagram for a startup sequence of a node in standby according to one embodiment of the disclosure.

From standby mode a node may initiate and attempt to startup the cluster. A node in standby mode may also execute method 1000 to determine whether another state may be entered if one or more sites in the cluster are online, at which time the initialization of method 1300 may be executed. FIG. 13 shows a flow chart illustrating a state diagram for a startup sequence of a node in standby according to one embodiment of the disclosure. A method 1300 begins at block 1302 with a node in standby state. At block 1304, the node determines whether another member node of a non-temporary site or a temporary site is reachable. If not, the node remains in standby state at block 1310. If yes, then the node determines if the member node is in a primary standby state. If so, then the node remains in standby mode at block 1310. If not, the node determines whether it is the next primary node for the site at block 1308. If so, the node enters standby primary state at block 1312. If not, the node remains in standby state at block 1310.

Figure 14:
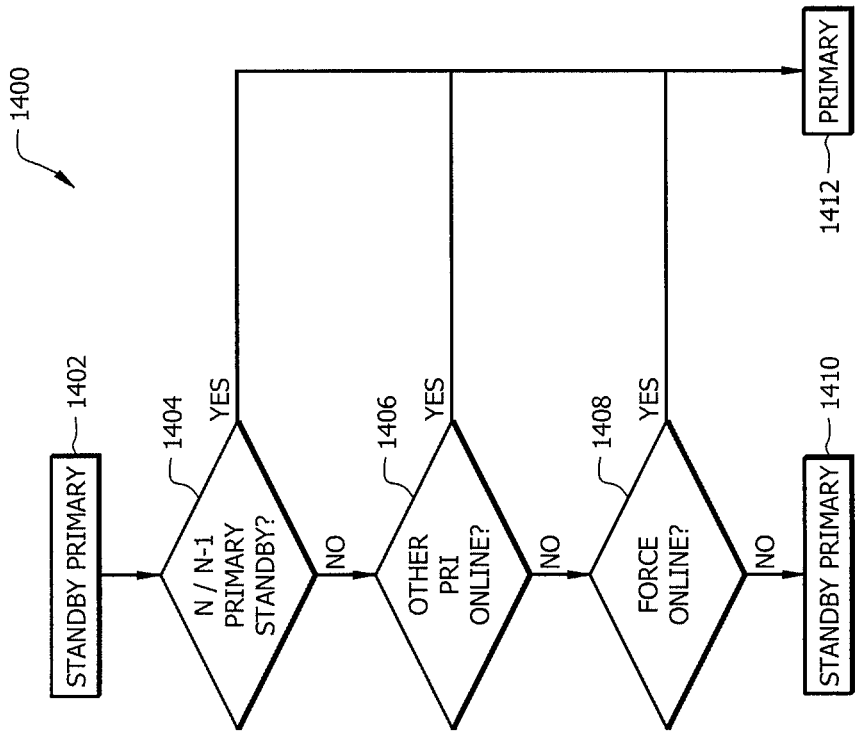
FIG. 14 shows a flow chart illustrating a state diagram for a startup sequence of a node in standby primary according to one embodiment of the disclosure.

A node may also attempt to start a cluster from the standby primary state. FIG. 14 shows a flow chart illustrating a state diagram for a startup sequence of a node in standby primary according to one embodiment of the disclosure. A method 1400 begins at block 1402 with a node in the standby primary state. At block 1404, the node determines whether all other or all other less one primary nodes are in primary standby state. If so, the node switches to primary state at block 1412. Other primary nodes may make the same decision and switch to a primary state. Further, other standby primary nodes may also detect that one other primary is online at block 1406 and change to primary mode. Member nodes may be in a standby state and come online through executing method 1000. If the node is not switched to primary node from block 1404 or block 1406, the node determines if the node is being forced online at block 1408. For example, an administrator may be manually forcing a restart of the cluster. If so, the node switches to primary state at block 1412. If not, the node remains in standby primary state at block 1410. If the first node switches from standby primary to primary state, from block 1404, 1406, or 1408, then other nodes may switch from standby primary to primary at block 1406.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
    detecting, by a first node, a lost connection from a second node of a first site of a cluster;
    attempting, by the first node, to reestablish communications with the second node;
    when reestablishing communications is unsuccessful, establishing, by the first node, a second site of the cluster;
    establishing, by the first node, communications with a primary node of a third site of the cluster, different from the first site and the second site; and
    communicating, by the first node, with the first site through the primary node of the third site.

2. The method of claim 1, further comprising:
    establishing communications with a third node of the first site that is also disconnected from the first site; and
    electing a primary node for the second site.

3. The method of claim 2, further comprising:
    receiving, by the first node, communications from the first site, the second site, and the third site after the first node is elected as the primary node for the second site; and
    calculating a topology of the cluster.

4. The method of claim 2, in which the step of electing the primary node comprises selecting the primary node from the second site based, in part, on a node identification number.

5. The method of claim 1, in which the step of establishing communications comprises:
    loading information regarding a state of the third site; and
    establishing communications through a communication path identified in the state information.

6. The method of claim 1, in which the first node is connected to a redundant array of independent drives.

7. The method of claim 1, in which the first node, the second node, and the third node form a cluster of a redundant storage device.

8. A computer program product, comprising:
    a non-transitory computer readable medium comprising:
        code to detect, by a first node, a lost connection from a second node of a first site;
        code to attempt to reestablish communications with the second node;
        code to establish, when reestablishing communications is unsuccessful, a second site; and
        code to establish communications with a primary node of a third site.

9. The computer program product of claim 8, in which the medium further comprises:
    code to establish communications with a third node of the first site that is also disconnected from the first site; and
    code to elect a primary node for the second site.

10. The computer program product of claim 9, in which the medium further comprises:
  code to receive, by the primary node, communications from the first site, the second site, and the third site; and
  code to calculate a topology of the cluster.

11. The computer program product of claim 10, in which the medium further comprises code to broadcast the calculated topology.

12. The computer program product of claim 9, in which the medium further comprises code to select the primary node based, in part, on a node identification number.

13. The computer program product of claim 8, in which the medium further comprises code to retrieve data from a redundant array of independent drives.

14. The computer program product of claim 8, in which the first node, the second node, and the third node form a cluster of a redundant storage device.

15. An apparatus, comprising:
  a first node of a cluster, comprising:
    a memory; and
    a processor coupled to the memory, in which the processor is configured:
      to detect a lost connection from a second node of a first site;
      to attempt to reestablish communications with the second node;
      to establish, when reestablishing communications is unsuccessful, a second site; and
      to establish communications with a primary node of a third site.

16. The apparatus of claim 15, in which the processor is further configured:
  to establish communications with a third node of the first site that is also disconnected from the first site; and
  to elect a primary node for the second site.

17. The apparatus of claim 16, in which the processor is further configured:
  to receive communications from the first site, the second site, and the third site; and
  to calculate a topology of the cluster.

18. The apparatus of claim 17, in which the processor is further configured to broadcast the calculated topology.

19. The apparatus of claim 16, in which the processor is further configured to select the primary node based, in part, on a node identification number.

20. The apparatus of claim 15, in which the first node is connected to a redundant array of independent drives (RAID) coupled to the processor.

* * * * *